(No Model.)  2 Sheets—Sheet 1.

J. WHITE.
STRAINER FOR ROOF LEADERS.

No. 511,388. Patented Dec. 26, 1893.

Attest:
L. Lee
Edw. F. Kinsey

Inventor.
James White, per
Crane & Miller, attys.

(No Model.) 2 Sheets—Sheet 2.
J. WHITE.
STRAINER FOR ROOF LEADERS.
No. 511,388. Patented Dec. 26, 1893.
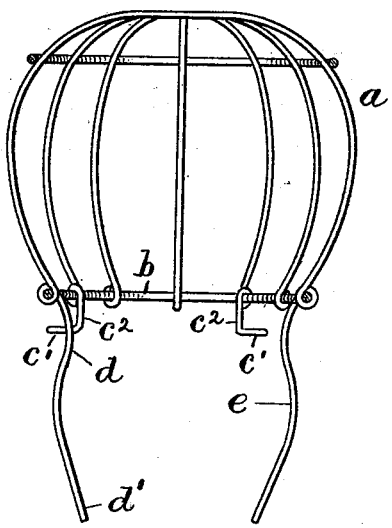
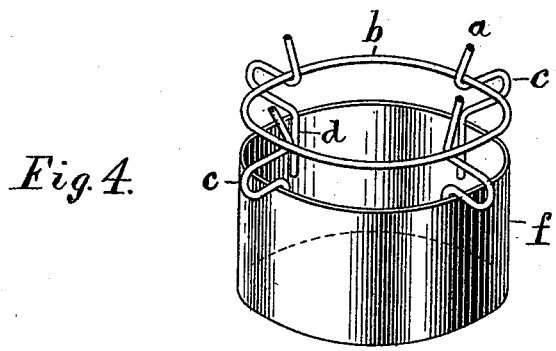

UNITED STATES PATENT OFFICE.

JAMES WHITE, OF BROOKLYN, NEW YORK.

STRAINER FOR ROOF-LEADERS.

SPECIFICATION forming part of Letters Patent No. 511,388, dated December 26, 1893.

Application filed April 1, 1892. Renewed May 29, 1893. Serial No. 475,983. (No model.)

*To all whom it may concern:*

Be it known that I, JAMES WHITE, a citizen of the United States, residing at Brooklyn, Kings county, New York, have invented certain new and useful Improvements in Strainers for Roof-Leaders, fully described and represented in the following specification and the accompanying drawings, forming a part of the same.

The object of this invention is to furnish a means of discharging fine particles of dirt from a roof gutter while preventing the admission to the water leader of leaves and similar objects. The strainers employed for such purposes are formed by securing wires together into a globular netting, and heretofore the strainers have been held in the inlet of the water leader by a large number of wire prongs extending directly downward from the wires which form the sides of the strainer. Such prongs are crowded into the water leader and form, where they project upward from its inlet, a series of obstructions by which small particles of fibrous matter are readily arrested, thus operating very soon to dam up the inlet and prevent the escape of the water, mud or silt from the gutter.

In my construction the cage or strainer proper is terminated at the bottom with an annular wire, and provided with only three or four prongs bent with a shoulder adapted to rest upon the bottom of the gutter, and to hold the entire cage above the inlet a sufficient distance for the water and small particles to escape, while the cage itself operates to arrest leaves and similar objects.

The construction will be understood by reference to the annexed drawings, in which—

Figure 1:
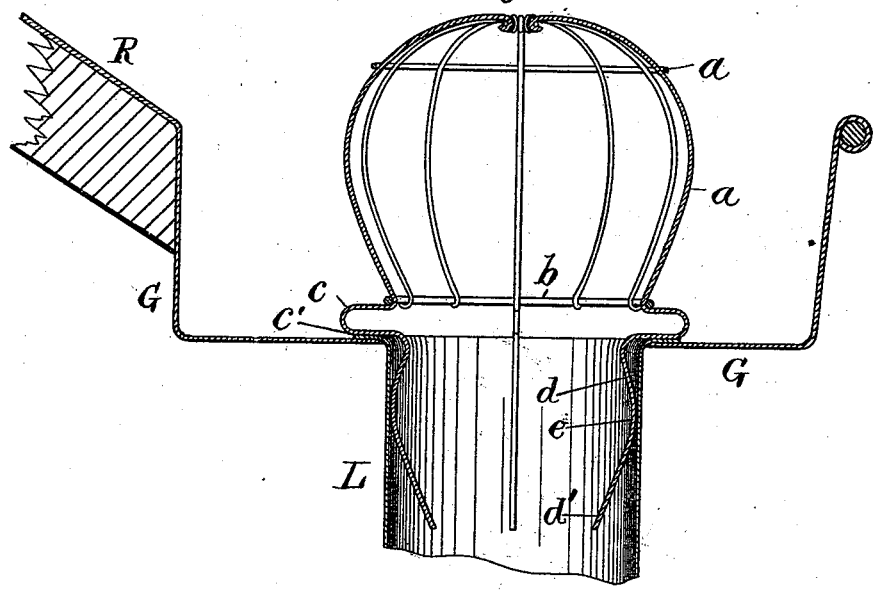
Figure 2:
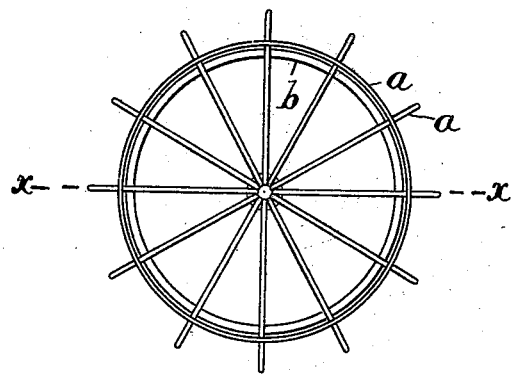

Figure 1 is a transverse section of a gutter, and the water leader discharging downward therefrom, with a section of the strainer on line $x$, $x$, in Fig. 2. Fig. 2 is a plan of the strainer, and Fig. 3 is an elevation of a strainer of alternative construction. In Fig. 1, G designates a gutter, R the edge of a roof discharging within the same, and L the water leader. Fig. 4 shows a strainer of open network $a$, of globular shape, with open bottom bounded by a wire ring $b$ to which the network of the strainer is attached.

A portion of the upright wires in the network is extended downward to form three or four prongs below the bottom ring $b$, each prong being bent into a loop $c$ adjacent to the bottom of the strainer. The prong is bent downward below the loop, and its upper portion $d$ is inclined outwardly, while the lower portion $d'$ is inclined inwardly; thus forming a swell $e$ upon the outer side of each prong, which is proportioned to crowd elastically within the leader pipe. The loops $c$ rest as shoulders $c'$ upon the gutter around the leader, and serve to hold the ring $b$ a short distance above the mouth or inlet of the leader. The number of prongs being very much less in my construction than in those heretofore used, the loops form little or no obstruction to the movement of the water and fine particles from the bottom of the gutter into the leader, and the water can thus escape beneath the ring $b$ without any obstruction.

The drawings show a construction with four prongs, but three are equally efficient, as the loops upon three prongs serve to hold the bottom ring of the strainer evenly above the mouth of the leader. By forming each prong with the outward swell $e$, the prongs are adapted to grasp the interior of the leader a little way below its mouth, and the loops may then be pressed down into close contact with the bottom of the gutter much better than if the prongs were tapered inwardly, the entire length, from the under side of the loop. The shoulder may be formed upon the strainer independently of the prong, as shown in Fig. 3, wherein three prongs are extended downward directly from the ring $b$, and three shoulders are formed by bending three wires downward and outward intermediate to the prongs, to rest upon the mouth of the leader.

The essential part of the invention is the termination of the strainer with the open ring $b$, and the provision of shoulders, as few as possible, to hold the ring above the bottom of the gutter, thus forming as free a passage as possible for the escape of the water.

By the use of my improved strainer, the gutter is much more effectively cleared, and the mud is prevented from accumulating around the mouth of the leader, and from sticking the leaves fast to the leader; as commonly occurs with other constructions. When the leaves dry they are thus blown away from the leader strainer instead of remaining and accumulating permanently. By the use of the shoulders upon the prongs, a base is furnished to support the strainer upon the bottom of the gutter, and the strainer is thus 5 rendered much more stable than if it were held in place merely by the prongs; and it is prevented much more perfectly from accidental displacement.

As the essential part of the invention is the 10 supporting of the strainer above the bottom of the gutter by means of shoulders, it is immaterial what means are provided for holding the strainer in the mouth of the leader, and other means than the prongs shown herein 15 may be used if desired.

It is obvious that a tube of sheet metal adapted to fit within the leader may be used instead of the prongs, and such a tube is shown in perspective in Fig. 4, with the ring 20 $b$ attached thereto and the remainder of the cage omitted to exhibit the connection of the ring with the tube more clearly. In this figure, the shoulders are formed as in Fig. 1, with the ends of the prongs extended within a tin tube $f$ and soldered to its inner side.

Having thus set forth the nature of my invention, what I claim herein is—

1. The leader strainer terminated at the bottom by wire $b$, provided with shoulders to sustain the wire above the bottom of the gutter, and with means for securing the strainer within the mouth of the leader, as and for the purpose set forth.

2. The leader strainer terminated at the bottom by wire $b$, and having the prongs formed each with loop $c$ and swell $e$, as herein set forth.

In testimony whereof I have hereunto set my hand in the presence of two subscribing witnesses.

JAMES WHITE.

Witnesses:
THOMAS S. CRANE,
JOSEPH M. STOUGHTON.